United States Patent [19]

Aoyama et al.

[11] 4,010,219

[45] Mar. 1, 1977

[54] FLAME RETARDANT POLYESTER COMPOSITION

[75] Inventors: Toshikazu Aoyama; Hotuma Okasaka; Hiroshi Kodama, all of Nagoya, Japan

[73] Assignee: Toray Industries, Inc., Tokyo, Japan

[22] Filed: Jan. 16, 1976

[21] Appl. No.: 649,714

Related U.S. Application Data

[63] Continuation of Ser. No. 580,682, May 23, 1975, abandoned, which is a continuation of Ser. No. 424,944, Dec. 17, 1973, abandoned.

[30] Foreign Application Priority Data

Dec. 28, 1972 Japan .................................. 48-2731

[52] U.S. Cl. ........................... 260/835; 260/45.7 R; 260/45.75 B; 260/45.8 A; 260/45.95 G
[51] Int. Cl.² .......................................... C08K 5/59
[58] Field of Search ..... 260/45.75 B, 835, 45.95 G, 260/45.8 A, 45.7 R

[56] References Cited

UNITED STATES PATENTS

| | | | |
|---|---|---|---|
| 2,924,532 | 2/1960 | Dereich | 260/45.75 |
| 3,547,873 | 12/1970 | Weissermel et al. | 260/75 |
| 3,909,485 | 9/1975 | Hongo et al. | 260/835 |
| 3,957,905 | 5/1976 | Sumoto et al. | 260/45.8 A |

*Primary Examiner*—V. R. Hoke

[57] ABSTRACT

A flame retardant polybutyleneterephthalate composition having excellent flame resistance with reduced tendency to drip during combustion, is provided by adding a halogenated diphenylether and a diepoxide compound to a polyester which contains at least 80 mole percent of terephthalic acid based on the total moles of dicarboxylic acid, and at least 80 mole percent 1,4-butanediol based on the total moles of diol. Decabromodiphenyl is an optional additive.

11 Claims, 2 Drawing Figures

FLAME RETARDANT POLYESTER COMPOSITION

This is a continuation of application Ser. No. 580,682 filed May 23. 1975, now abandoned which in turn is a continuation of application Ser. No. 424,944, filed Dec. 17, 1973 was abandoned.

BACKGROUND OF THE INVENTION

1. Field of the Invention

The present invention relates to a polyester composition, especially polybutyleneterephthalate (hereinafter designated PBT) composition which can be molded in the usual way to form a shaped article having excellent physical properties and excellent flame resistance with reduced tendency to drip during combustion.

In essence the composition comprises (a) a polyester the main component of which is polybutyleneterephthalate, (b) a halogenated diphenylether, optionally decabromodiphenyl as a flame retarding agent, and (c) diepoxy compounds.

2. Description of the Prior Art

In recent years, PBT resins have been investigated and developed as molding materials because of their excellent moldability and their possession of a good balance of physical properties. Such resins have been expected to be widely used as excellent engineering plastics and raw materials for machine parts, electrical equipment, motor cars, and housings.

The engineering plastics are strictly required to have excellent flame resistance in addition to a good balance of chemical and physical properties.

Accordingly, it is of considerable commercial importance to be able to impart excellent flame resistance to PBT resins without any substantial impairment of their physical properties.

In order to provide a flame retardant PBT composition various additives have heretofore been proposed. However, these compositions have been quite unsatisfactory in many commercial uses.

As an example, reference may be made to Japanese patent publication (Tokkaisho No. 46-2086). According to this prior publication, an improved PBT composition has been proposed wherein decabromodiphenyl is added in combination with antimony trioxide.

Though the shaped article obtained from this composition has rather satisfactory flame resistance, it has a poor surface appearance with many brown or black spots, and it exhibits deteriorated physical properties, particularly low tensile elongation at the break point. Therefore, this composition cannot be used successfully in commercial practice.

As another example, reference may be made to U.S. Pat. No. 3,624,024, which proposes an improved PBT composition comprising brominated diphenyl or brominated diphenylether as flame retardants, together with talc. Although the shaped article obtained from this PBT composition has satisfactory flame resistance and has a high heat distortion temperature, it has poor tensile elongation at break, which is considered to be undesirable for many commercial uses.

An object of this invention is to provide an improved PBT composition which can produce a shaped article having excellent flame resistance with reduced tendency to drip during combustion, and which has good appearance and high tensile elongation at break.

It has been discovered according to the present invention that excellent results can be attained by forming a PBT composition containing a halogenated diphenylether in combination with a small amount of a diepoxy compound.

A composition comprising polyethyleneterephthalate and diepoxy compounds has already been described in Japanese patent publication No. 46-10671. It is stated in this reference that polyethyleneterephthalate shaped articles made from this composition have high impact strength and good dimensional stability. However, this reference does not teach the combination of flame retarding additives with diepoxy compounds.

Moreover, this reference does not teach or suggest that a PBT shaped article acquires superior flame resistance an excellent balance of physical properties, especially high tensile elongation at break, and good appearance by reason of the combination of specific flame retarding additives with certain diepoxy compounds.

SUMMARY OF THE INVENTION

The present invention relates to a flame retardant polyester composition which comprises (A) a polyester of at least about 80 mole percent terephthalic acid based on the total moles of dicarboxylic acid and at least about 80 mole percent 1, 4-butanediol based on the total moles of diol, (B) from about 4 to 30 weight percent halogenated diphenylether based on the weight of the polyester as flame retarding additives represented by the following general formula:

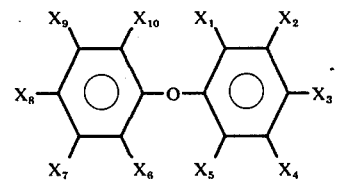

wherein $X_1 - X_{10}$ represent hydrogen, chlorine, or bromine, at least two of which are chlorine or bromine, and (C) from about 0.01 – 3 weight percent diepoxy compound based on the weight of the polyester.

DRAWINGS

DESCRIPTION OF THE PREFERRED EMBODIMENT

Figure 1:
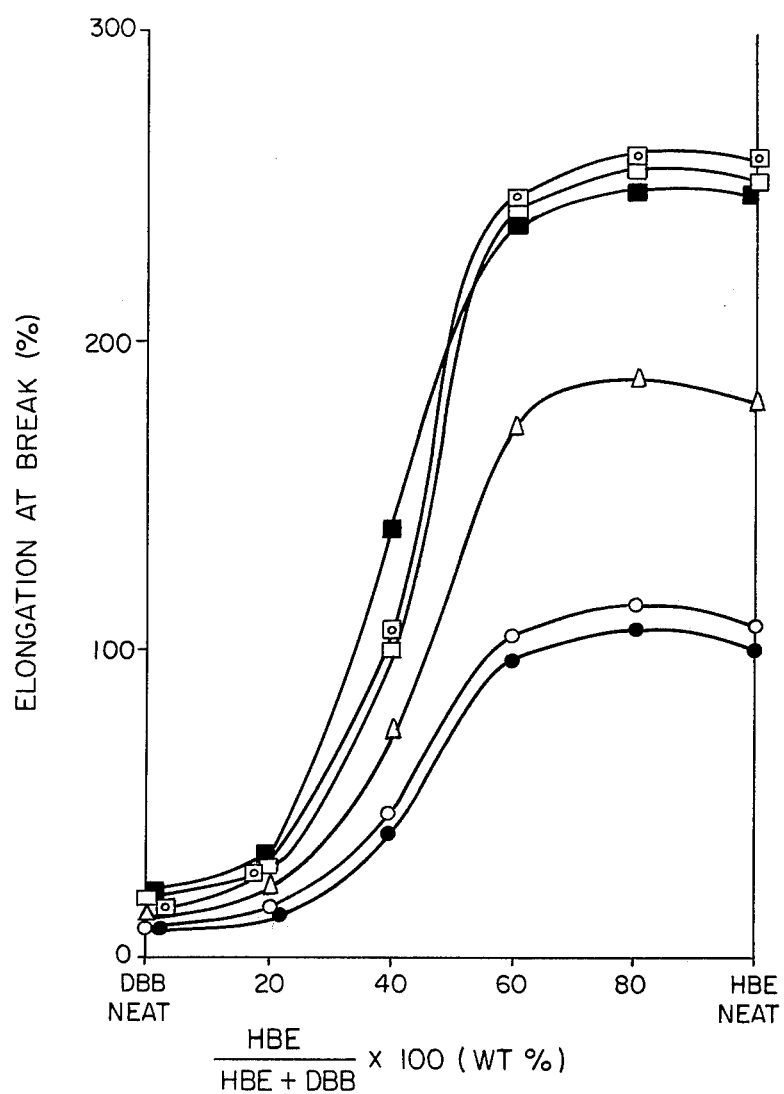
FIG. 1 is a graph showing the relation between tensile elongation at break and each combination of flame retarding additive with diepoxy compound with respect to each sample obtained in Example 1 of this invention.

The polyester used in this invention is a PBT or a copolymer which is composed of at least about 80 mole percent terephthalic acid based on the total moles of dicarboxylic acid, at least 80 mole percent 1, 4-butanediol based on the total moles of diol and a copolymerizable dicarboxylic acid and/or diol. Suitable copolymerizable dicarboxylic acids which may be used in the practice of this invention are isophthalic acid, p,p'-diphenyldicarboxylic acid, 4,4'-dicarboxylphenoxyethane, adipic acid, sebacic acid, and 2,6-naphthalenedicarboxylic acid.

Suitable copolymerizable diols which may be used in the practice of this invention are ethylene glycol, propylene glycol, 1, 6-hexane diol, diethylene glycol, 2,2-dimethylpropylene glycol, 1,4-cyclohexane dimethanol, p-xylylene glycol, 1,4-benzene diethanol, and 2,2-bis(-4-hydroxyphenyl-) propane.

Blends of more than 70 weight percent of PBT or copolymer defined above and less than 30 weight percent of other polymers may be used also as polymer components of the composition of this invention.

Suitable other polymers used in this invention are polyethylene, polypropylene, ethylene-vinylacetate copolymer, ethylene-acrylate copolymer, ethylene-propylene copolymer, chlorinated polyethylene, chlorinated polypropylene, polybutadiene, polystyrene, styrene-acrylonitrile-butadiene copolymer, styrene-acrylonitrile copolymer, polyvinylchloride, polystyrene, modified polyphenyleneoxide, polytetrafluoroethylene, ethylene-tetrafluoroethylene copolymer, polycarbonate, polyethyleneterephthalate, and polypropyleneterephthalate.

Other additives such as dyes, pigments, nucleating agents, fillers, mold release agents, plasticizers, stabilizers, lubricants, foaming agents and the like can be added to the composition of this invention.

The flame retarding additives used in the composition of this invention should be selected from the halogenated diphenylethers represented by the general formula mentioned above and its specific mixture with decarbromodiphenyl.

These flame retarding additives are stable at a temperature above 260° C and therefore do not decompose during the molding operation, which is usually carried out above 260° C. Moreover, they can impart superior flame resistance with reduced dripping characteristics during combustion, to a polyester as defined in this invention.

Suitable halogenated diphenylethers which may be used in the practice of this invention are decabromodiphenylether, octabromodiphenylether, hexabromodiphenylether, pentabromodiphenylether, tetrabromodiphenylether, tribromodiphenylether, dibromodiphenylether, hexachlorodiphenylether, pentachlorodiphenylether, tetrachlorodiphenylether, trichlorodiphenylether, and dichlorodiphenylether.

Halogenated diphenylethers having at least six chlorines or bromines, in particular hexabromodiphenylether, octabromodiphenylether, and decabromodiphenylether are preferable.

The use of the halogenated diphenylether alone as a flame retarding additive in the composition of our invention can impart a satisfactory flame resistance with reduced dripping characteristics during combustion, but it is preferred to use the halogenated diphenylether in combination with decabromodiphenyl because further improved dripping characteristics upon combustion can be attained.

In using the halogenated diphenylether in combination with decabromodiphenyl, the preferred ratio by weight of the former to the latter is within the range from about 30:70 to 95:5.

When this ratio is below about 30:70, the shaped article obtained from the composition has a poor appearance because of surface spotting. It also has poor physical properties.

The amount of flame retarding additive can comprise, based on the weight of polyester, from about 4 to 30 weight percent and in a preferred embodiment can comprise from about 5 to 25 weight percent.

A small amount of flame retarding additive, below about 4 weight percent, cannot contribute satisfactory flame resistance. Too much additive, above about 30 weight percent, gives only a shaped article with poor physical properties, in particular, poor tensile elongation at break.

In order further to enhance the flame resistance of the composition of this invention, it is preferred to use an antimony-containing compound consisting essentially of antimony trioxide in addition to the flame retarding additives defined above. In this case, the preferred content of antimony-containing compound is within the range from about 1 to 18 weight percent based on the weight of the polyester.

The term "diepoxy compound" used in this specification means a compound represented by the general formula

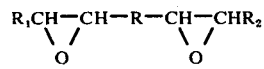

wherein $R_1$ and $R_2$ represent hydrogen, alkyl, cycloalkyl, aryl, or aralkyl, and $R_1$ and $R_2$ may be bonded to each other, and R represents alkylene, cycloalkylene, arylene, alkarylene, or aralkylene, each of which may optionally have an ether group and/or ester group, and R may be optionally bonded to $R_1$ and/or $R_2$.

Suitable diepoxy compounds which may be used in the practice of this invention are polycondensates of epihalohydrin such as epichlorohydrin with a diol, preferably having up to 15 carbon atoms, such as diphenylolpropane (so called bisphenol "A") in any ratio, bis-(2,3-epoxypropanol)-esters obtained by esterification of dicarboxylic acids, preferably having up to 15 carbon atoms, such as terephthalic acid, phthalic acid, 2,6-naphthalenedicarboxylic acid, adipic acid, succinic acid and dodecane dicarboxylic acid with 2,3-epoxypropanol, and cycloaliphatic diepoxides, preferably having 5 – 15 carbon atoms, such as cyclooctadiene-(1,5)-diepoxide, 1,2,5,6-diepoxy cyclododecane-(9), bicycloheptadiene diepoxide, dicyclopentadiene diepoxide.

These diepoxy compounds can prevent PBT or copolymer having flame retarding additives from suffering from a decrease of tensile elongation at break.

We have found that the addition of these diepoxy compounds to PBT, or to a copolymer having no flame retarding agent, can increase the tensile elongation at break of the shaped article to some degree and, surprisingly, a great decrease of tensile elongation at break of the PBT shaped article which usually accompanies the addition of the flame retarding agent can be prevented to a satisfactory degree by addition of these diepoxy compounds. This is not to be expected at all from observation of experiments wherein polybutyleneterephthalate or a copolymer having no flame retarding agent is used.

Figure 2:
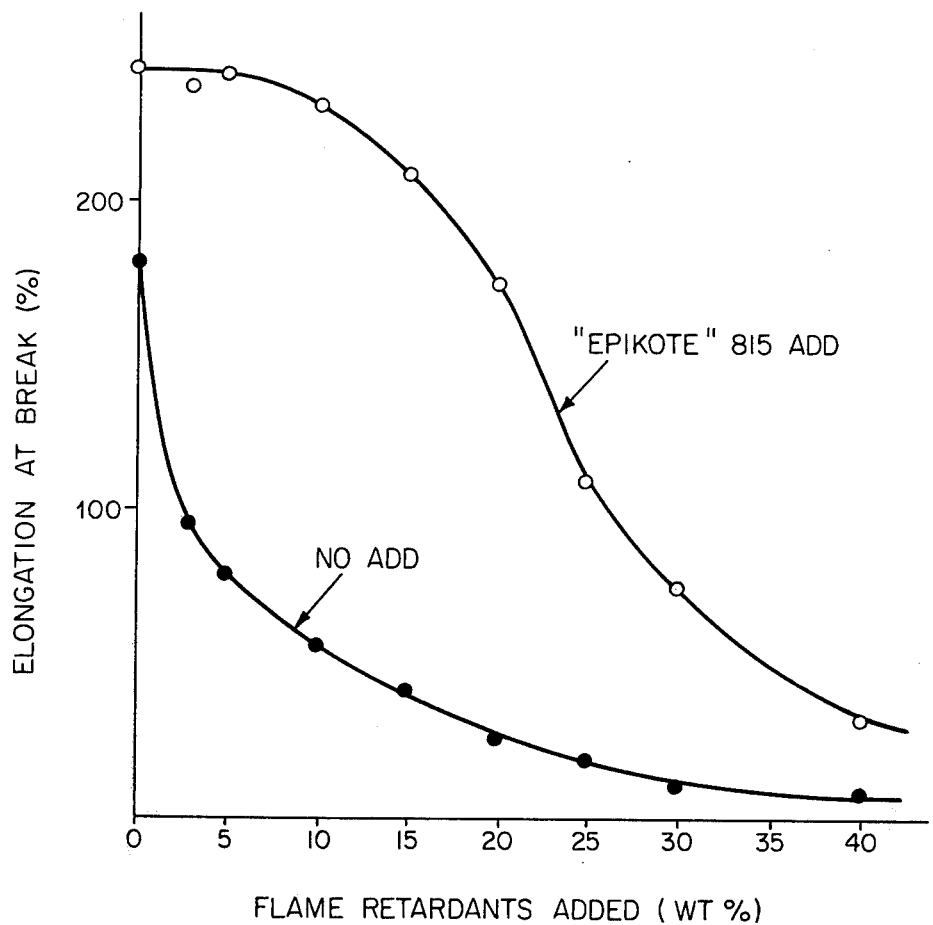
FIG. 2 is a graph showing the relation between tensile elongation at break and each combination of flame retarding additive with diepoxy compound with respect to each sample obtained in Example 3 of this invention.

For example, as shown in FIG. 2, the tensile elongation at break of the PBT composition containing only flame retarding agents becomes much lower as the content of added flame retarding agents increases. When this content is more than 5 weight percent, practicable levels of tensile elongation at break cannot be attained. However, the tensile elongation at break of a PBT composition containing both less than 30 weight percent, especially 25 weight percent, of flame retarding agents, and diepoxy compounds can be maintained at a high level.

Moreover, the addition of diepoxy compounds to polybutyleneterephthalate or copolymer prevents it from dripping during combustion to a considerable degree.

The amount of diepoxy compounds can comprise, based on the weight of the polyester, from about 0.01 to 2.5 weight percent and in a preferred embodiment can comprise from about 0.05 to 1.0 weight percent.

When this amount is less than 0.01 weight percent, the tensile elongation at break of the composition is too low for practical use.

When this amount is more than about 3 weight percent, not only the tensile elongation at break of the composition levels off, but moldability becomes poor.

There is no restriction on the time or production stage in which flame retarding agents, diepoxy compounds, and antimony containing compounds should be added to the polyester, but it is usually convenient to add them to the polyester chips.

The flame retardant polyester composition provided by this invention can be molded by conventional methods, e.g. extrusion, injection molding, press molding and the like.

The following examples are representative of this invention.

EXAMPLE 1

Polybutylene terephthalate having an intrinsic viscosity of 1.20 was mixed with decabromodiphenyl, hexabromodiphenylether, antimony trioxide and Epikote 815 (a bisphenol "A" diglycidylether produced by Shell Chem. Co., Ltd.) using a Henschel Mixer, and extruded at 240° C into pellets using a 65 mm$\phi$ extruder. These pellets were dried at 130° C for 5 hours in a vacuum and subsequently molded into about 1 mmt press sheet on a hot plate controlled at 250° C. Dumbbell type tensile test specimens were punched out from this press sheet, and tested for tensile elongation at break. The results obtained are given in FIG. 1. The components in blend were:

| | |
|---|---|
| Polybutyleneterephthalate | 100 phr |
| Decabromodiphenyl + Hexabromodiphenylether | 10 phr |
| Sb$_2$O$_3$ | 5 phr |
| "Epikote" 815 | 0–3.0 phr |

The chemical structure of Epikote 815 is given below, where n is normally zero.

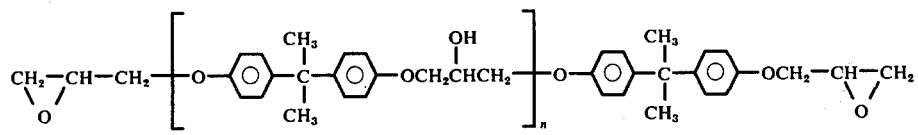

In FIG. 1 the flame retardants used are signified as follows:
DBB: decabromodiphenyl
HBE: hexabromodiphenylether As shown in FIG. 1, Epikote 815 improves tensile elongation at break of a flame resistant polybutyleneterephthalate excellently in a large extent of DBB/HBE compositions, particularly with more than 30 wt % HBE content. While using more than 70 weight % DBB based on the total weight of the flame retardants, poor tensile elongation is obtained.

EXAMPLE 2

The pellets obtained in Example 1, where 0.5 wt % of diepoxy compounds were added, were injection molded into 5 by ½ by ⅛ inch flammability test bars using an in-line screw type injection molding machine at 250° C on the cylinder and nozzle and 40° C on the mold. The time, in seconds, over which the specimen continued to burn was measured with each ten test bars by the vertical flame resistance test in Underwriters Laboratory's subject No. 94 method. The results are summarized in Table 1. The flame resistance of the shaped articles is excellent. When more than 70 weight % DBB based on the total weight of the flame retardants was used, many spots in brown or black colors were formed in the shaped articles and the surface appearance was rough and poor.

Table 1

| DBB (wt%) | HBE (wt%) | Flame application | Extinguishing time (sec.) |
|---|---|---|---|
| 100 | 0 | 1 | 0 |
|  |  | 2 | 0 |
| 80 | 20 | 1 | 0 |
|  |  | 2 | 0 |
| 60 | 40 | 1 | 0 |
|  |  | 2 | 0 |
| 40 | 60 | 1 | 1 |
|  |  | 2 | 0 |
| 20 | 80 | 1 | 2 |
|  |  | 2 | 0 |
| 0 | 100 | 1 | 2 |
|  |  | 2 | 1 |
| 0 | 0 | 1 | Burning |

EXAMPLE 3

Polybutyleneterephthalate used in Example 1, 100 phr, DBB/HBE mixure (one-fourth wt ratio) or decabromodiphenylether (signified as DBE as follows) 12 phr, antimony trioxide 6 phr and various amounts of diepoxy compounds (Epikote 815) given in Table 2 were mixed and molded into flammability test bars in the same manner as in Example 2.

Extinguishing time, manner of dripped particles of molten materials during test, and total weight of dripped particles were measured. The results are summarized in Table 2.

Table 2

| Flame retardant | Amount of diepoxy compound (wt% based on polybutyleneterephthalate) | Flame application | Extinguishing time (sec.) | Dripped particles (number) | Total dripped (mg) |
|---|---|---|---|---|---|
|  | 0 | 1 | 0 | 0 | 0 |
|  |  | 2 | 1 | 3 | 71 |
|  | 0.1 | 1 | 0 | 0 | 0 |
|  |  | 2 | 1 | 3 | 57 |

Table 2-continued

| Flame retardant | Amount of diepoxy compound (wt% based on polybutylene-terephthalate) | Flame application | Extinguishing time (sec.) | Dripped particles (number) | Total dripped (mg) |
|---|---|---|---|---|---|
| DBB/HBE | 0.5 | 1 | 0 | 0 | 0 |
|  |  | 2 | 1 | 2 | 35 |
|  | 1.0 | 1 | 0 | 0 | 0 |
|  |  | 2 | 0 | 1 | 23 |
|  | 2.0 | 1 | 0 | 0 | 0 |
|  |  | 2 | 1 | 1 | 22 |
|  | 0 | 1 | 0 | 0 | 0 |
|  |  | 2 | 1 | 5 | 108 |
|  | 0.1 | 1 | 0 | 0 | 0 |
|  |  | 2 | 0 | 4 | 74 |
| DBE | 0.5 | 1 | 0 | 0 | 0 |
|  |  | 2 | 0 | 3 | 58 |
|  | 1.0 | 1 | 0 | 0 | 0 |
|  |  | 2 | 0 | 2 | 36 |
|  | 2.0 | 1 | 0 | 0 | 0 |
|  |  | 2 | 0 | 1 | 23 |

As shown in Table 2, diepoxy compounds improve the dripping characteristics of molten materials during combustion.

EXAMPLE 4

Polybutylene terephthalate having an intrinsic viscosity of 1.10, various total amounts of flame retardants and diepoxy compounds (Epikote 815), in compositions given below, were mixed and molded into dumbbell type tensile test specimens in the same manner as in Example 1. The specimen samples were tested for tensile elongation at break and compared with those prepared without any addition of diepoxy compound. Flammability test bars having the same size as those of Example 2 were molded and tested for flame resistance by the horizontal burning method as described in ASTM.D-635, and by the vertical burning method as described in Underwriters Laboratory's subject No. 94.

The results obtained are summarized in FIG. 2 and in Table 3. The components in the blend were:

| Polybutyleneterephthalate | 100 phr |
|---|---|
| DBB/HBE/Sb₂O₃ (3/7/4 in wt.) | various total amounts |
| "Epikote" 315 | 0.5 phr |

Table 3

| OBB+HBE added (wt% based on weight of polybutylene-terephathalate) | Tensile Elongation at break (%) "Epikote" 815 added | Tensile Elongation at break (%) "Epikote" 815 not added | Flammability ASTM D-635 | Flammability Dripping characteristics during test |
|---|---|---|---|---|
| 0 | 242 | 181 | B | XX |
| 3 | 237 | 96 | B | X |
| 5 | 241 | 80 | SE NB | Δ |
| 10 | 232 | 58 | NB | O |
| 15 | 210 | 43 | NB | O |
| 20 | 174 | 25 | NB | O |
| 25 | 110 | 20 | NB | O |
| 30 | 76 | 11 | — | Δ |
| 40 | 32 | 9 | — | X |

The symbols appearing in Table 2 have the following meanings:
XX: severe dripping of flowing particles was observed
X: the number of dripping particles was more than 10 during two flame applications
Δ: the number of dripping particles was 5 - 10 during two flame applications
O: the number of dripping particles was less than 5 during two flame applications FIG. 2 and Table 3 indicate that an article molded from a blend of polybutyleneterephthalate, more than 5 wt % (DBB + HBE), Sb₂O₃, and "Epikote" 815 is self-extinguishing and in addition has an unexpectedly high tensile elongation at break, which is more than about 4 times higher than those without using "Epikote" 815 in less than 30 wt %, particularly less than 25 wt %, (DBB + HBE) addition.

The results of the flammability tests show that flame resistance of the molded article is satisfactory in more than 4 wt % (DBB + HBE) addition, but more than 30 wt % addition increases the tendency of the molded article to drip.

EXAMPLE 5

A blend of polybutyleneterephthalate having an intrinsic viscosity of 1.25, diepoxy compounds, halogenated diphenylether, DBB and Sb₂O₃ was prepared and molded into tensile test specimens and flammability test bars, and tested for elongation at break and flame resistance by the horizontal burning method as described in ASTM D-635.

The components in the blend were:

| polybutyleneterephthalate | 100 phr |
|---|---|
| DBB | various amounts as stated |
| halogenated diphenylether |  |
| Sb₂O₃ |  |
| diepoxy compound | 0.3 phr |

Table 4

| DBB (wt% based on weight of polybutyleneterephthalate) | Halogenated diphenylether Compound (wt% based on weight of polybutyleneterephthalate) | | Sb₂O₃ (wt% based on weight of polybutyleneterephthalate) | Diepoxy compounds | Tensile elongation at break (%) | Flammability test (ASTM D-635) |
|---|---|---|---|---|---|---|
| 5 | HBE | 7 | 6 | none | 63 | Non burning |
| 5 | HBE | 7 | 6 | A | 160 | Non burning |
| 5 | HBE | 7 | 6 | B | 188 | Non burning |
| 5 | HBE | 7 | 6 | C | 194 | Non burning |

Table 4-continued

| DBB (wt% based on weight of polybutyleneterephthalate) | Halogenated diphenylether Compound | | Sb₂O₃ (wt% based on weight of polybutyleneterephthalate) | Diepoxy compounds | Tensile elongation at break (%) | Flammability test (ASTM D-635) |
|---|---|---|---|---|---|---|
| | (wt% based on weight of polybutyleneterephthalate) | | | | | |
| 4 | D | 9 | 5 | none | 54 | Non burning |
| 4 | D | 9 | 5 | E | 124 | Non burning |
| 4 | F | 10 | 6 | none | 102 | Non burning |
| 4 | F | 10 | 6 | E | 211 | Non burning |
| 0 | G | 12 | 6 | none | 52 | Non burning |
| 0 | G | 12 | 6 | E | 192 | Non burning |
| 5 | G | 7 | 6 | none | 48 | Non burning |
| 5 | G | 7 | 6 | E | 184 | Non burning |

The symbols appearing in Table 4 have the following meanings:
A: bis (2,3-epoxypropyl) terephthalate
B: cyclooctadiene (-1,5-) diepoxide
C: "Epikote" 1004 (epoxy resin of Shell Chem. Co. Ltd.)
D: dibromodiphenylether
E: "Epikote" 815
F: tetrachlorodiphenylether
G: decabromodiphenylether (in this case PBT having an intrinsic viscosity of 1.35 was used and extruded at 295° C)

The results in Table 4 indicate that diepoxy compounds containing ester groups or cyclic structures or having a higher molecular weight with a structure of the same kind as "Epikote" 815 can also be used in this invention and, by using a halogenated diphenylether compound such as dibromodiphenylether, tetrachlorodiphenylether and decabromodiphenylether, a polybutyleneterephthalate composition having a high tensile elongation at break and also having increased flame resistance, is obtained.

The following is claimed:

1. A flame retardant thermoplastic polyester composition which comprises
   A. a polyester containing at least about 80 mole percent terephthalic acid based upon the total number of moles of dicarboxylic acid, and at least about 80 mole percent 1,4-butanediol based upon the total number of moles of diol,
   B. about 4 to 30 weight percent of aromatic halogenated diphenylether represented by the following general formula, said weight percent being based on the weight of the polyester,

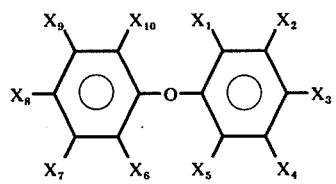

wherein each of $X_1$ through $X_{10}$ represents a member selected from the group consisting of hydrogen, chlorine and bromine, and at least two X's are chlorine or bromine, and
   C. about 0.01 to 3 weight percent diepoxy compound based on the weight of the polyester, said diepoxy compound being represented by the general formula

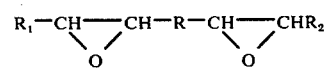

wherein $R_1$ and $R_2$ represent hydrogen, alkyl, cycloalkyl, aryl, or aralkyl, and $R_1$ and $R_2$ may be bonded to each other, and R represents alkylene, cycloalkylene, arylene alkarylene or aralkylene, each of which may optionally have an ether group and/or an ester group, and R may be optionally bonded to $R_1$ and/or $R_2$.

2. The composition of claim 1 wherein said flame retarding additive further contains decabromodiphenyl.

3. The composition of claim 1 further comprising
   D. an antimony-containing compound consisting essentially of antimony trioxide.

4. The composition of claim 3 wherein the content of said antimony-containing compound is within the range from about 1 to 18 weight percent based on the weight of the polyester.

5. The composition of claim 1 wherein the halogenated diphenylethers have at least six chlorines or bromines.

6. The composition of claim 1 wherein the halogenated diphenylethers are selected from the group consisting of hexabromodiphenylether, octabromodiphenylether, and decabromodiphenylether.

7. The composition of claim 1 wherein the diepoxy compound is selected from the group consisting of polycondensates of epichlorohydrin with diphenylolpropane.

8. The composition of claim 2 wherein the ratio by weight of the halogenated diphenylether to decabromodiphenyl is within the range from about 3:7 to 19:1.

9. The composition of claim 1 wherein the total content of flame retarding additive is within the range from about 5 to 25 weight percent based on the weight of the polyester.

10. The composition of claim 1 wherein the content of diepoxy compound is within the range from about 0.05 to 2.5 weight percent based on the weight of the polyester.

11. The composition of claim 1 wherein the diepoxy compound is selected from the group consisting of polycondensates of epihalohydrin with diol, bis-(2,3-epoxy propanol)-esters which are the product of esterification of dicarboxylic acid with 2,3-epoxypropanol, and cycloaliphatic diepoxides.

* * * * *